3,179,489
PROCESS OF PREPARING SOLUBLE PHOSPHORUS NITRILE CHLORIDE POLYMERS
Margot Becke, Scheffelstr. 4, Heidelberg, Germany
No Drawing. Filed Dec. 22, 1958, Ser. No. 781,889
6 Claims. (Cl. 23—14)

The present invention relates to thermally stable rubber-like phosphorus nitrile chloride polymers of a degree of polymerization between 50 and 200. More particularly the present invention relates to rubber-like thermally stable phosphorus nitrile chloride polymers of a degree of polymerization between 80 and 100. Said polymers are soluble in organic solvents, such as chloroform, benzene, and nitrobenzene, and can be used as fire preventing agents, for instance, in paints and coatings. The present invention relates also to a process of preparing such rubber-like polymers.

When ammonium chloride and phosphorus pentachloride are caused to react at elevated temperatures in a high pressure resistant tube, as described by H. N. Stokes in "Am. Chem. J.," vol. 19, page 782 (1897), a crystalline slurry of the empirical formula $NPCl_2$ is produced. This substance consists of a mixture of several polymers which can be separated from each other. On heating this mixture at 330° C. for several hours a higher polymer which is an insoluble and non-volatile substance of the same composition $NPCl_2$ is obtained. The properties of this polymer resemble those of slightly vulcanized rubber, and, therefore, it is also called phosphorus nitrile chloride rubber.

It is one object of the present invention to provide a rubber-like phosphorus nitrile chloride polymer of a degree of polymerization from as low as 50 to as high as 200, and more particularly of a degree of polymerization between 80 and 100, which polymer is soluble in organic solvents, such as chloroform, benzene, and nitrobenzene, and which is thermally stable even at a temperature exceeding 250° C.

Another object of the present invention is to provide a simple and effective process of preparing such rubber-like phosphorus nitrile chloride polymer.

Still another object of the present invention is the utilization of such a rubber-like phosphorus nitrile chloride polymer as a fire preventing agent, for instance, in paints and other coatings.

These and other objects of the present invention and advantageous features thereof will become apparent as the description proceeds.

In principle, the present invention is based on the surprising finding that not only the known rubber-like phosphorus nitrile chloride polymer which is insoluble in all organic solvents, but also a soluble phosphorus nitrile chloride polymer can be prepared. Said soluble polymer is in many respects similar to said known rubber-like phosphorus nitrile chloride. In order to prepare a polymer according to the present invention, first an oily phosphorus nitrile chloride is prepared according to known methods. The yellow oil which has been freed of the trimeric and tetrameric phosphorus nitrile chlorides is dissolved in a dry organic solvent such as chloroform and benzene. A small amount of water is then added, for instance, an amount between about 0.5% and about 6.0% by weight calculated for the oily phosphorus nitrile chloride used as starting material. The water may be adsorbed on a suitable adsorbent carrier or it may be dissolved in a solvent such as dioxane, acetone, or ether, which is miscible with the solvent for the oily phosphorus nitrile chloride polymer. Thereby, further polymerization takes place yielding a polymer which has a greater solubility in such organic solvents than the known rubber-like polymers. It can readily be separated from the adsorbent carrier.

Suitable adsorbent carriers for the water are animal charcoal, kieselguhr, silica gel, silicates, alumina and the like. After evaporating the solvent, a rubber-like, honey-colored substance remains. It can be ground in a mortar to fine, almost white particles which, however, return to their original rubbery state upon standing for a prolonged period of time.

In contrast to the known substantially insoluble rubber-like phosphorus nitrile chloride polymer, the polymers according to the present invention are soluble in boiling chloroform and do not precipitate upon cooling, provided the solution is not too concentrated. The solubility in cold nitro benzene is somewhat lower than in chloroform and is even lower in cold benzene. The polymer is dissolved by both solvents on heating and precipitates for the most part in unchanged condition when cooled. The thermal stability of the polymer is relatively good. Their decomposition point lies above 250° C.

The soluble rubber-like polymer prepared according to the present invention depolymerizes on heating in a high vacuum at 360° C. and yields thereby the trimeric phosphorus nitrile chloride.

The polymers, according to the present invention, are useful as flame proofing agents, for instance, in highly heat-resistant paints and coatings.

The following examples serve to illustrate the present invention, without, however, limiting the same thereto:

*Example 1*

120 g. of a phosphorus nitrile chloride mixture of an average degree of polymerization of 6.2 are dissolved in 250 cc. of benzene. 20 g. of non-purified animal charcoal are added to the solution. The mixture contains about 1.5% by weight of water calculated for the oily phosphorus nitrile chloride used as starting material. The mixture is heated to boiling on a water bath for 20 minutes, whereby hydrogen chloride is generated. On subsequent cooling the solution becomes jelly-like. In order to remove the animal charcoal, the mixture is diluted with benzene to a volume of 1,000 cc. whereby it becomes less viscous. The charcoal is then removed by centrifuging. The charcoal-free benzene solution is evaporated in a vacuum, and the last residual solvent is distilled off in a high vacuum at 120° C. 60 g. of a rubber-like, honey-colored mass remain corresponding to 50% of the theoretical amount. The resulting polymer is easily soluble in boiling chloroform and does not precipitate upon cooling.

In order to purify the polymer, it can be recrystallized from nitro benzene, for instance, by heating 15 g. thereof under anhydrous conditions in 200 cc. of pure, dry nitro benzene to 200° C., filtering off undissolved material over glass wool, and cooling the filtrate. The mother liquor is decanted from the precipitated polymer which is boiled several times with petroleum ether (B.P. 60–70° C.) in order to remove residual nitro benzene.

Example 2

50 g. of oily phosphorus nitrile chloride of an average degree of polymerization of 14.8 are dissolved in 200 cc. of benzene. 5 g. of finely powdered silica gel, containing 17.8% of water are added to the resulting solution. The mixture is refluxed, while excluding moisture, for 20 minutes. Hydrogen chloride is generated and a rubber-like substance precipitates. As soon as the reaction is completed, the benzene solution is separated from the solid residue and the benzene is distilled off. The residue which consists of silica gel and polymer is extracted with chloroform whereby the silica gel remains undissolved. After evaporating the chloroform, a rubber-like polymer remains which can be purified by dissolving it in benzene and reprecipitating it with petroleum ether (B.P. 60–70° C.). A further amount of polymer is obtained from the benzene solution by evaporating the benzene. The combined amounts of soluble polymer are dried by heating, in a high vacuum, for a prolonged period of time. The total yield is 47 g. corresponding to 97% of the theoretical amount.

Analysis:

|  | Percent |
|---|---|
| Phosphorus | 26.7 |
| Nitrogen | 11.9 |
| Chlorine | 59.3 |

Example 3

15 g. of oily phosphorus nitrile chloride of an average degree of polymerization of 14.8 are dissolved in 100 cc. of benzene. The resulting solution is mixed with 5 g. of coarse silica gel containing 17.7% of water. The mixture is refluxed, while excluding moisture, for one hour. Hydrogen chloride is generated and a rubbery substance precipitates, which is worked up as described in Example 2. The total yield is 14.4 g. corresponding to 96% of the theory.

Example 4

15 cc. of dioxane containing 2% of water are rapidly added, drop by drop, to a boiling solution of 15 g. of oily phosphorus nitrile chloride of an average degree of polymerization of 14.8 in 100 cc. of benzene. After refluxing the mixture for a short time, the desired rubber-like polymer precipitates. The supernatant solution is decanted. The amount of precipitated polymer is 4.2 g. On standing for a prolonged period of time, an additional amount of polymer precipitates from the mother liquor. Precipitation is completed by adding petroleum ether. After removing adhering solvent, another 10.3 g. are obtained. The total yield, thus, is 14.5 g. corresponding to 97% of the theoretical amount.

Analysis:

|  | Percent |
|---|---|
| Phosphorus | 26.9 |
| Nitrogen | 12.2 |
| Chlorine | 60.0 |

In place of benzene and chloroform used in the preceding examples there may be employed other solvents, for instance, other aromatic hydrocarbons, such as toluene, xylene, or the like, or halogenated aliphatic or aromatic hydro-carbons such as carbon tetrachloride, trichloro ethylene, tetrachloro ethane, chloro benzene, or the like.

The amount of water which must be present when converting the yellow oily phosphorus nitrile chloride polymer into the soluble rubber-like polymer may vary. An amount of water between about 0.5 and about 6.0% by weight, calculated for the oily starting material employed, has proved to be sufficient. The preferred amount is an amount between 1.5% and 2%.

As stated above, the new rubber-like phosphorus nitrile chlorides of the formula $[NPCl_2]_x$ are polymers of a degree of polymerization between about 50 and about 200. The most suitable polymers have a degree of polymerization between about 80 and about 100. The degree of polymerization is determined by esterifying the phosphorus nitrile chloride polymer with sodium ethylate in ethanol and cryoscopically determining the molecular weight of the resulting ester.

The solubility of the new polymers is, of course, dependent upon its degree of polymerization. In boiling chloroform it is about 7.0 g. per 100 cc. and in chloroform of 20° C. about 5.0 g. per 100 cc.

The solubility in boiling nitro benzene is about 2 g. per 100 cc., while at room temperature the solubility is only about 1.7 g. per 100 cc.

The solubility in boiling benzene is about 2.0 g. per 100 cc., while at room temperature the solubility is only about 1.3 g. per 100 cc.

In dimethyl formamide of 20° C. the solubility is also about 1 g. per 100 cc. In contrast thereto the rubber-like phosphorus nitrile chloride polymer obtained by heating the soluble oily phosphorus nitrile chloride polymer at 330° C. for several hours, is substantially insoluble in said boiling solvents.

The phosphorus content of the phosphorus nitrile chloride polymer, according to the present invention, is between about 26.0% and 28.0%, its nitrogen content is between 11.9% and 13.0% and its chlorine content between 58.5% and 60.5%.

As stated hereinabove, the new rubber-like phosphorus nitrile chloride polymer has proved to be of value as flame proofing agent. For this purpose it is, for instance, admixed in amounts between about 10.0% and about 50% to paints and pigmented coatings, either as such or in the form of their chloroform solutions. It may also be used for flame proofing of textiles, wood, plastics, such as polyvinyl chloride, halogenated rubber, and other materials.

Of course, many changes and variations in the starting material used, in the reaction conditions, temperature, and duration, in the amount of water added and the adsorbent water carrier, in the manner of working up the reaction mixture and of purifying the new phosphorus nitrile chloride polymers, in the manner of utilizing said polymers as flame proofing agents and the like, may be made by those skilled in the art in accordance with the principles set forth herein and in the claims annexed hereto.

I claim:

1. In a process of preparing a rubber-like phosphorus nitrile chloride polymer, the steps which comprise dissolving an oily phosphorus nitrile chloride of an average degree of polymerization between 6 and 20 in an organic solvent containing an amount of water between 0.5% and 6.0% of the weight of the oily phosphorus nitrile chloride polymer used as starting material and heating the solution on a water bath until the degree of polymerization of the resulting polymer is between 50 and 200.

2. The process according to claim 1, wherein water is added to the reaction solution in the form of a solid adsorbent having adsorbed the required amount of water.

3. The process according to claim 1, wherein the solid adsorbent is a member of the group consisting of animal charcoal, silica gel, kieselguhr, an adsorptive silicate, and alumina.

4. The process according to claim 1, wherein the water is added to the reaction solution in the form of a solution in an organic solvent miscible with the solvent for the oily phosphorus nitrile chloride starting material.

5. The process according to claim 4, wherein the organic solvent miscible with the solvent for the oily phosphorus nitrile chloride starting material is a solvent of the group consisting of dioxane, acetone, and ether.

6. The process according to claim 1, wherein the organic solvent for dissolving the oily phosphorus nitrile chloride polymer starting material is benzene.

(References on following page)

References Cited by the Examiner

UNITED STATES PATENTS 2,586,312 2/52 Dishon ---------------- 260—2
2,872,283 2/59 Taylor ---------------- 23—14

OTHER REFERENCES

Yost et al.: "Systematic Inorganic Chemistry," pub. by Prentice-Hall Inc., 1944, pp. 108–113.

F. Patat et al.: Die Makromoleculare Chemie, vol. 6, March 1951, pp. 292–317, pp. 303 and 306 relied on.

Berkman et al.: Catalysis, Inorganic and Organic, pub. by the Reinhold Pub. Corp., N.Y. (1940), p. 628.

P. H. Groggins: Unit Processes in Organic Synthesis, pub. by the McGraw-Hill Book Co., Inc., N.Y., 1938, 2nd ed., pp. 704–5.

MAURICE A. BRINDISI, *Primary Examiner.*